United States Patent
Uzrad-Nali et al.

(10) Patent No.: US 7,668,841 B2
(45) Date of Patent: Feb. 23, 2010

(54) VIRTUAL WRITE BUFFERS FOR ACCELERATED MEMORY AND STORAGE ACCESS

(75) Inventors: Oran Uzrad-Nali, Sunnyvale, CA (US); John H. Shaffer, Rochester, MN (US); Kevin G. Plotz, Byron, MN (US)

(73) Assignee: Brocade Communication Systems, Inc., San Jose, CA (US)

( * ) Notice: Subject to any disclaimer, the term of this patent is extended or adjusted under 35 U.S.C. 154(b) by 1054 days.

(21) Appl. No.: 10/796,273

(22) Filed: Mar. 10, 2004

(65) Prior Publication Data
US 2004/0268017 A1    Dec. 30, 2004

Related U.S. Application Data

(60) Provisional application No. 60/452,969, filed on Mar. 10, 2003.

(51) Int. Cl.
*G06F 7/00* (2006.01)
*G06F 17/00* (2006.01)
*G06F 12/00* (2006.01)

(52) U.S. Cl. .................... 707/100; 707/101; 707/200
(58) Field of Classification Search .............. 707/7, 707/1–3, 200–202, 204, 205, 100–102
See application file for complete search history.

(56) References Cited

U.S. PATENT DOCUMENTS

| | | | |
|---|---|---|---|
| 6,421,343 B1 * | 7/2002 | Jun et al. ............... | 370/395.72 |
| 7,076,568 B2 * | 7/2006 | Philbrick et al. ............ | 709/250 |
| 7,124,205 B2 * | 10/2006 | Craft et al. .................. | 709/250 |
| 7,324,520 B2 * | 1/2008 | Lakshmanamurthy et al. .......................... | 370/394 |
| 7,403,525 B2 * | 7/2008 | Sano et al. .................. | 370/392 |
| 2003/0033431 A1 * | 2/2003 | Shinomiya .................. | 709/245 |
| 2004/0006636 A1 * | 1/2004 | Oesterreicher et al. ...... | 709/231 |
| 2004/0064590 A1 * | 4/2004 | Starr et al. .................. | 709/250 |

\* cited by examiner

*Primary Examiner*—Don Wong
*Assistant Examiner*—Merilyn P Nguyen
(74) *Attorney, Agent, or Firm*—Wong, Cabello, Lutsch, Rutherford & Brucculeri LLP

(57) ABSTRACT

A method for accelerating storage access in a network. The method comprises receiving a data record having a plurality of data segments. The data segments are stored in a local memory of a network controller (NC). A virtual write buffer (VWB) entry is assigned for the incoming data record in the NC local memory. The data segments of said data record are reassemble using the VWB. The data record is sent from the network controller directly to an I/O controller of a storage device.

32 Claims, 6 Drawing Sheets

VIRTUAL WRITE BUFFERS FOR ACCELERATED MEMORY AND STORAGE ACCESS

RELATED APPLICATIONS

This Application claims priority from U.S. Provisional Application Ser. No. 60/452,969 filed Mar. 10, 2003, the contents of which are incorporated herein by reference.

FIELD OF THE INVENTION

This disclosure teaches techniques related to handling of received data segments in storage networks, and more particularly to reassembling of the received data segments into private buffers.

BACKGROUND

In the related art, a CPU of a computer connected to a network may spend a high portion of its time, processing network communications and leaving less time available for other tasks.

Typically, a significant amount of tasks handled by a computer network include demands for moving data records between the network devices and storage devices. Traditionally, such data is segmented into packets (or segments) and send from a source node (computer) to a receiving node (computer). Such a transportation over the network involved each packet being encapsulated in layers of control information that are processed one layer at a time by the CPU of the receiving node. Although the speed of CPUs has constantly increased, this protocol processing of network messages such as file transfers can consume a significant amount of the available processing power of even the fastest commercially available CPU.

Reference is now made to FIG. 1 which illustrates a schematic diagram of a networked storage system 100 in a related art. System 100 includes a host 110 connected to network 130, through a network controller (NC) 120. Host 110 is connected to the NC 120 by an I/O bus 140, such as a peripheral component interconnect (PCI) bus. System 100 further includes storage device 150 connected to the I/O bus 140 through an I/O controller 160. Storage device 150 may be a disk drive, a collection of disk drives, a redundant array of independent disks (RAID), and the like.

Both host 110 and NC 120 include memories 115 and 125 respectively. Local memory 125 and host memory 115 may be composed of dynamic random access memory (DRAM), static random access memory (SRAM), and other forms of memory. Host 110 includes a CPU and internal memory (not shown), for controlling various tasks, including a file system and network messages processing.

It should be noted that in a related art, NC 120, host 110, I/O controller 160, and I/O bus 140 could be integrated in Storage Target system 180.

Following is an example illustrating a data flow from a source computer 170 to a storage device 150, through network system 100 in a related art. Source computer 170 initiates the data transmission by sending a write data request to Storage Target system 180. Source computer 170 writes data records (e.g., a file, a portion of file) that are typically larger than the size of packets transmitted over network 130. Hence, source computer 170, using a transport control protocol (TCP) layer mechanism, segments the data records to smaller size segments, as dictated by the network protocols. Segments then need to be reassembled to data records by the TCP layer mechanism in host 110, before they can be written to storage 150.

FIG. 2 shows an example of a segmentation process in a related art where data record 220 is segmented into five segments 210-1 through 210-5. As can be seen in FIG. 2, the segmentation process is not deterministic. In other words, the segmentation process may result in a single record being segmented into a large number of variable sized segments. Conversely, a segment may include data from more than one record. For example, in FIG. 2 segments 210-1 and 210-5 include data from different records.

Segments transmitted from the source computer 170 through the network 130 are received in NC 120. NC 120 processes the TCP layer and reassembles the segments into data records. The reassembled records are then stored in local memory 125. In order to present the records efficiently to I/O controller 160, private data buffers are allocated in host memory 115. A separate private buffer is associated with each incoming record. Host 110 may allocate private buffers in different sizes, where the size of a buffer is determined according to host 110 resources or configuration.

For each allocated private buffer, host 110 indicates the buffer size and its address. Reassembled records are then sent directly by NC 120 to the host memory's 115 buffers, normally using a direct memory access (DMA). After reassembling the record into a private buffer, the record is sent from host memory 115 back over the I/O bus 140 to I/O controller 160 to be stored in storage 150. Thus, a record that has been sent to a host computer from a network for storage requires a double-trip across an already congested I/O bus.

A method for eliminating the double-trip across the I/O bus is disclosed in U.S. patent application Ser. No. 09/970,124. In the '124 application, packets sent from source computer 170 are first received at NC 120 and saved in local memory 125. NC 120 performs link layer processing such as verifying that the packet is addressed to host 110. The received packets are reassembled to a record by copying the packets from local memory 125 to a cache file located at local memory 125. Once the record reassembly is complete, the cache file is sent to I/O controller 160 by DMA. Although, this method eliminates the double-trip across I/O bus 140, it requires copying data from a first location in local memory 125 to a second location in local memory 125 to achieve the normalization of the received segments.

SUMMARY

It will be advantageous to provide techniques to avoid the problems noted above.

The disclosed teachings provide a method for accelerating storage access in a network. The method comprises receiving a data record having a plurality of data segments. The data segments are stored in a local memory of a network controller (NC). A virtual write buffer (VWB) entry is assigned for the incoming data record in the NC local memory. The data segments of said data record are reassembled using the VWB. The data record is sent from the network controller directly to an I/O controller of a storage device.

In a specific enhancement, a private buffer is allocated in a host local memory.

In another specific enhancement, the NC is coupled to a storage target system and to a network.

More specifically, the data segments are virtually reassembled in said NC local memory to form a reassembled data record.

In yet another specific enhancement the I/O controller is further coupled to a storage device.

In still another specific enhancement the data is received using a sub-process comprising performing a transport layer processing on the data segments and assigning a memory object descriptor (MOD) each to each of the data segments.

More specifically, each said MOD points to a memory location where a corresponding data segment is stored in the NC local memory.

More specifically, the MODs are linked together to form a record structure.

More specifically, an available private buffer is used from a pool of pre-allocated private buffers.

In another specific enhancement, the NC maintains a VWB table, wherein said VWB table includes at least a VWB entry.

More specifically, the VWB entry comprises at least two sub-entries, wherein a first sub-entry is an offset field and a second sub-entry is a pointer field.

Even more specifically, memory address space of said VWB entry is mapped to memory address space of the allocated private buffer when the VWB entry is assigned.

Even more specifically, reassembling said data segments comprises setting said offset field and said pointer field.

Still more specifically, setting said offset field and said pointer field further comprises iteratively, for each MOD, determining a size of a corresponding data segment pointed by said each MOD. The offset field is set to a size of said corresponding data segment pointed by said MOD. The pointer field is set to point to said each MOD.

Even more specifically, a VWB entry is associated with each said allocated private buffer.

Still more specifically, the reassembled data record is sent to the I/O controller using a sub-process comprising providing said I/O controller with an address space of said private buffer associated with said VWB entry. The address space of said VWB entry is translated to a physical address location of said reassembled data record. The reassembled data record is obtained from said physical address location. The reassembled data record is sent directly to said I/O controller over an I/O bus.

Still more specifically, the physical address location designates a location of said reassembled data record in the NC local memory.

More specifically, said I/O controller is provided with the address of said private buffer, upon initiating a direct memory access (DMA) request by said I/O controller.

More specifically, the NC sends said reassembled data record, upon a reception of a DMA read request initiated by said I/O controller.

Another aspect of the disclosed teachings is a computer program product, including computer-readable media with instructions to enable a computer to implement the techniques described above.

Yet another aspect of the disclosed teachings is a network controller (NC) capable of accelerating storage access, comprising a core processor adapted to execute an accelerated storage access process. A receive handler receives data record from a network. A direct memory access controller (DMAC) transfers said data record directly to an I/O controller using a virtual write buffer (VWB). Finally, a local memory is provided.

In a specific enhancement, the NC is coupled to a storage target system and to said network.

More specifically, the network is at least one of: network attached storage (NAS), storage area network (SAN), system area network (SAN).

In another specific enhancement, the data segments constituting said data record are virtually reassembled in said NC local memory.

More specifically, the receiver handler is adapted to receive the data record comprising of a plurality of data segments and being assigned a virtual write buffer (VWB) in a VWB table, said VWB being adapted to enable reassembling the data segments to form an reassembled data record.

Even more specifically, the NC is adapted to allocate a private buffer in a local host memory.

Still more specifically, the NC is adapted to perform a transport layer processing on said data segments and assign a memory object descriptor (MOD) each to each of said data segments.

BRIEF DESCRIPTION OF THE DRAWINGS

The disclosed teachings will become more apparent by describing in detail examples and embodiments thereof with reference to the attached drawings in which.

DETAILED DESCRIPTION

Figure 1:
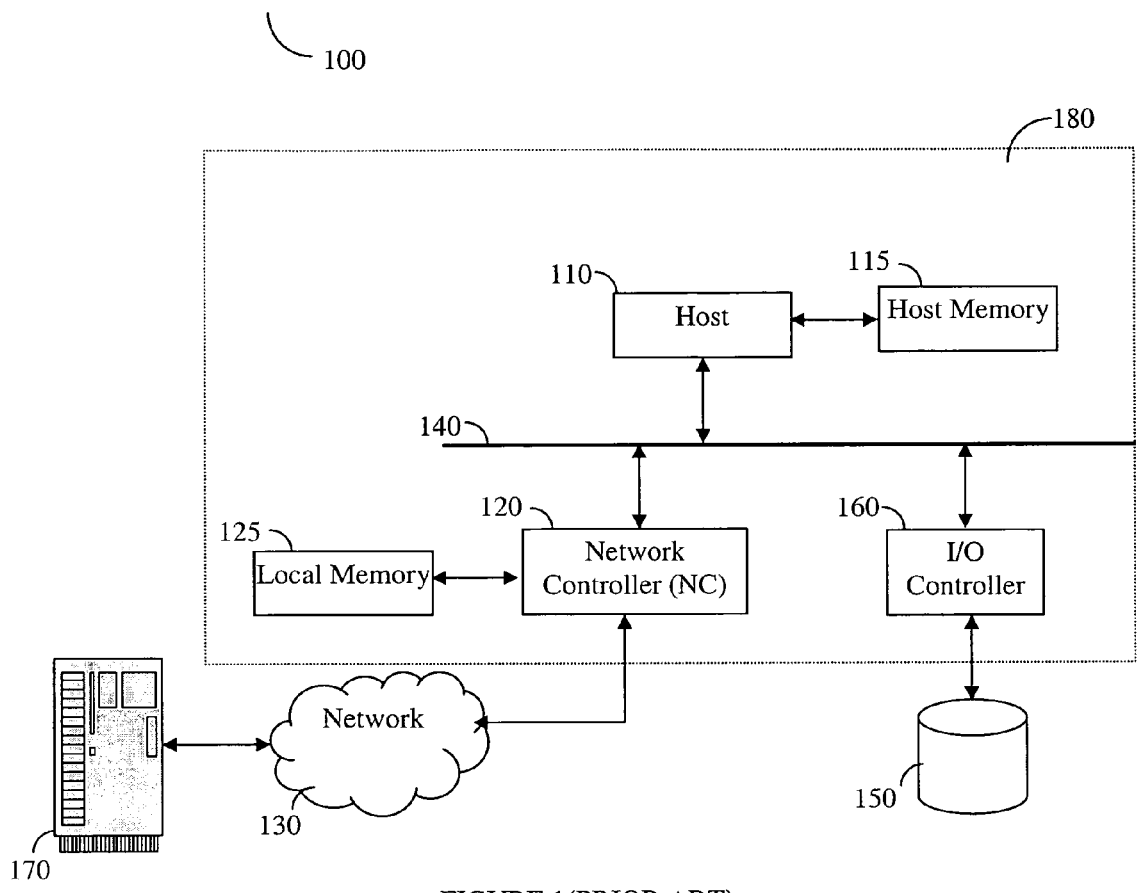
FIG. 1 is a schematic diagram of an example networked storage system in the related art.
Figure 2:
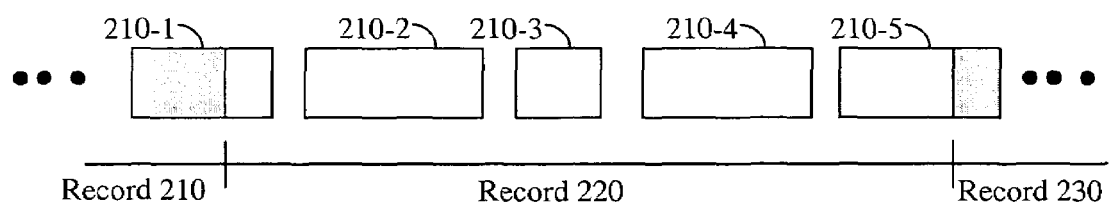
FIG. 2 is a schematic diagram illustrating the segmentation of a record in the related art.
Figure 3:
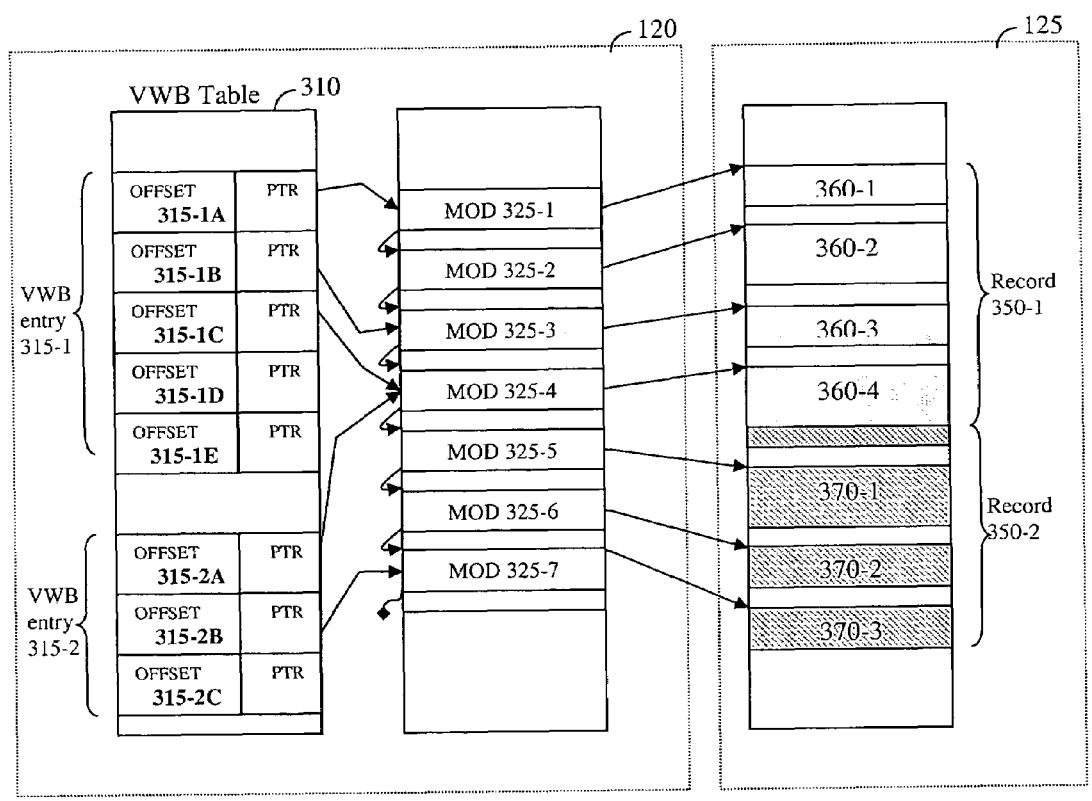
FIG. 3 is an exemplary diagram of the operation of the virtual write buffer (VWB) embodying aspects of the disclosed teachings.

FIG. 3 shows an exemplary diagram illustrating an operation of the virtual write buffer (VWB) embodying aspects of the disclosed teachings. The provided techniques allow NC 120 to align the received segments and virtually reassemble them into private buffers, in order to enable I/O controller 160 a direct memory access to local memory 125. A private buffer each is associated with each incoming record. Host 110 may allocate private buffers in different sizes, where for each allocated private buffer, host 110 indicates its size.

NC 120 manages the received segments using a VWB table 310 and a plurality of Memory Object Descriptors (MODs) 325. MODs 325 are scattered across local memory 125. MODs 325 are associated with at least one VWB entry 315. If a single segment (e.g., segment 360-4) includes data that belongs to more than one record, then a single MOD 325 is associated with more than one VWB entry 315. As can be seen in FIG. 3, segment 360-4 includes data belongs to records 350-1 and 350-2. Therefore, both sub entries 315-1C and 315-2A point to MOD 325-4 which points to segments 360-4. Each MOD 325 contains pointers, including, but not limited to, a pointer to a memory location such as a memory location where a TCP received segment is stored, and a pointer to another MOD 325. If MOD 325 is the last MOD in the series, the next MOD pointer is set to null.

VWB table 310 includes a plurality of VWB entries 315. Each of the VWB entries 315 represents a private buffer associated with a single record stored in local memory 125. VWB entries 315 are mapped into the address space of host memory 115. Each sub-entry of VWB entry 315 points to an incremental offset value from the beginning of the record stored at local memory 125. For example, the size of a private buffer represented by VWB entry 315-1 is 5 KB. VWB entry 315-1 includes five sub-entries 315-1A through 315-1E, where each sub-entry represents an offset value of 1 KB from the beginning of record 350-1, i.e., there is a sub-entry for each 1 KB of data in record 350-1. Specifically, sub-entry 315-1A points to the beginning of record 350-1, sub-entry 315-1B points to 1 KB offset from the beginning of record 350-1, and sub-entry 315-1C points to 2 KB offset from the beginning of record 350-1. As each sub-entry points to 1 KB in record 350-1 and only three sub-entries are used, the size of record 350-1 is 3 KB. The size of the private buffer represented by a VWB entry is determined by host 110, while the amount of data in a record pointed by each sub-entry equals to the size of the private buffer divided by the number of sub-entries. The size of an allocated private buffer is generally not equal to the size of a received record.

The number of sub-entries is programmable. Yet, as the number of sub-entries increases, the time required to random access memory decreases. A detailed example describing the read process is provided below. Each sub-entry in VWB entry 315 includes an offset and a pointer fields. The offset field is used as an offset value to the segment pointed to by MOD 325. The pointer field includes a pointer that points to the respective MOD 325. The size of a sub-entry is a few bytes required to maintain the offset and the pointer fields. A detailed description of the MODs is found in U.S. patent applications Nos. 10/219,673 and 10/281,312 by Oran Uzrad-Nali et al. assigned to common assignee and which are hereby incorporated by reference for all that it discloses.

TCP processing is performed on the received segments. These include, validity checks, acknowledgement generation, handling of fragmented data, determination of the beginning of a record, putting in order out of order segments, and other TCP related activities. After the TCP processing is completed, the received segments are linked in local memory 125 in the correct order, i.e., according to the order that form the original record. For every segment in local memory 125, NC 120 maintains a single MOD 325 that points to the beginning of the payload data in the segment. Payload data is the actual data in the packet, i.e., the data after the headers section.

MODs 325 that belong to record data are linked together to form the incoming byte-stream for a TCP connection. NC 120 assigns MODs 325 to segments prior to performing the TCP processing. After TCP processing and upper layer protocol (ULP) PDU delineation, NC 120 sends a request to host 110 requesting for a private buffer allocation. Upon receiving the request, host 110 allocates a single VWB entry 315 in VWB table 310. Alternatively, host 110 may pre-allocate a pool of free private buffers, i.e., allocate a plurality of VWB entries 315 in VWB table 310.

NC 120 then uses a single VWB 315 for each incoming record. As the number of available VWB 315 decreases, host 110 allocates new VWB 315, (i.e., private buffers) to VWB table 310. By allocating a pool of free buffers, the latency that results from waiting for a private buffer allocation each time a record has been received, is eliminated. Host 110 may allocate a plurality of pools of buffers each associated with a plurality of different connections. Or, it may allocate a single common pool of buffers and associate it with a plurality of different connections.

Once, VWB entry 315 is allocated, NC 120 virtually reassembles the received segments and arranges them into an allocated private buffer. Namely, NC 120 sets the offset and the pointer fields in the allocated VWB entry 315 with the appropriate values. The process for setting the VWB entry can be considered as a virtual DMA. The virtual DMA procedure is described in greater detail below.

After the reassembly is complete, I/O controller 160 receives control of the address space of host memory 115, which includes an indication from where to fetch the record. As I/O controller 160 performs a DMA read, NC 120 recognizes the VWB address of entry 315 associated with the desired record and translates the virtual address of the entry to a physical address in local memory 125. NC 120, using VWB table 310 and MODs 325, fetches the record data physically from local memory 125 and returns it to I/O controller 160. Once the entire data record is sent to I/O controller 160, host 110 frees the allocated VWB entry.

FIG. 3 shows two allocated VWB entries 315-1 and 315-2 associated with records 350-1 and 350-2, respectively. As can be seen MOD 325-2 is not pointed by any of VWB entry's 315-1 entries. It should be noted that the sub-entries of VWB entries 315-1 and 315-2 have the same size.

It should be noted that VWB entries are specially designed to support private ULP buffers. The ULPs represent a wide variety of applications, such as internet Small Computer System Interface (iSCSI), Remote Direct Memory Access (RDMA), and Network File System (NFS). These and other network applications use the services of TCP/IP and other lower layer protocols to provide users with basic network services.

Figure 4:
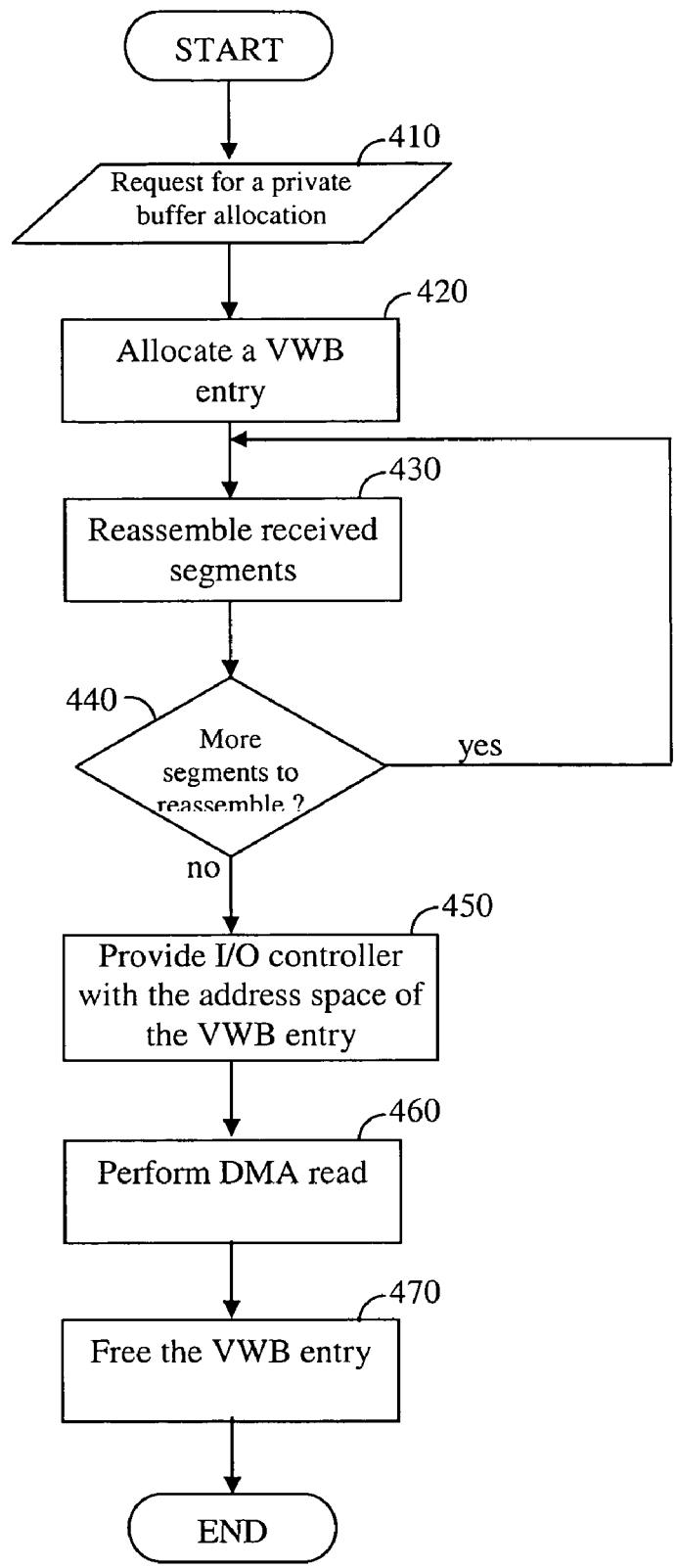
FIG. 4 is an exemplary flowchart of the method for executing the VWB process embodying aspects of the disclosed teachings.

Reference is now made to FIG. 4 which shows an exemplary flowchart 400 illustrating aspects of the disclosed teachings. The segments to be reassembled are stored in the correct order in local memory 125, as a result of TCP processing and ULP PDU delineation. At step 410, a private buffer is allocated. In one exemplary implementation, NC 120 may use an available private buffer from a pool of pre-allocated private buffers. This way the latency that results from the host 110 waiting to serve the request is reduced. At step 420, host 110 allocates VWB entry 315 in VWB table 310. The address space of the allocated VWB entry 315 is mapped into the address space of the private buffer in host memory 115. At step 430, the offset and the pointer fields of a sub-entry (e.g. 315-1A) of VWB entry 315 are set to their appropriate values through the "virtual DMA" process (for example, see paragraph 28, above).

The pointer field is set to point on MOD 325 associated with the sub-entry. The offset field is set to an offset value in the segment pointed by MOD 325, associated with the current sub-entry. The offset value is different from zero if the received segment includes data belonging to a different record, or that the received segment is already pointed to by another sub-entry. The offset and the pointer fields of VWB entry 315 are set with the appropriate value by traversing the linked list of MODs 325. Prior to the execution of step 430, NC 120 is provided with the first MOD in the linked list (e.g., MOD 325-1) and with an offset value within this MOD. Further, NC 120 is provided with the number of bytes that host 110 desires to read from the designated record (e.g., record 350-1).

For each of the MODs 325, NC 120 checks the size of the segment pointed by the current MOD 325 and sets the pointer and the offset fields of VWB entry 315 accordingly. It should be noted that the number of bytes requested by host 110 may be less than the record size. Step 430 represent an example of the virtual DMA process, as segments are virtually aligned to private buffer without moving data within local memory 125 or between local memory 125 and host memory 115.

At step 440, it is determined if there are more segments to be reassembled. If so, the procedure continues with step 430, otherwise the procedure continues with step 450. At step 450, once the record is reassembled in a private buffer and is ready to be transferred to storage means 150, host 110 provides I/O controller 160 with the address space of host memory 115 indicating from where to fetch the reassembled record, namely the address of the private buffer represented by VWB entry 315.

At step 460, I/O controller 160 performs a DMA read. As a result, NC 120 recognizes the VWB entry's 315 address and translates this address to the physical address in local memory 125, where the record data is stored. In addition, NC 120 obtains the record data and sends it to I/O controller 160. At step 470, once the entire record data has been sent to I/O controller 160, host 110 releases and recycles the allocated VWB entry 315.

Figure 5A:
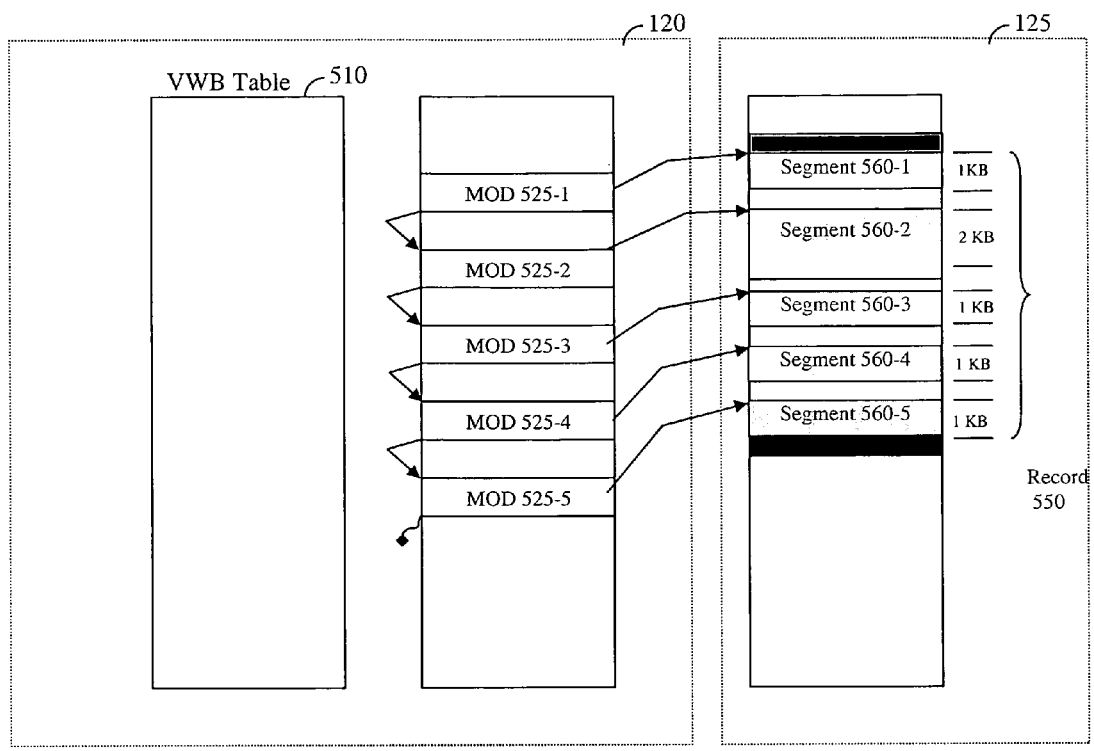
FIG. 5A-B show an example for reassembling of a record embodying aspects of the disclosed teachings.
Figure 5B:
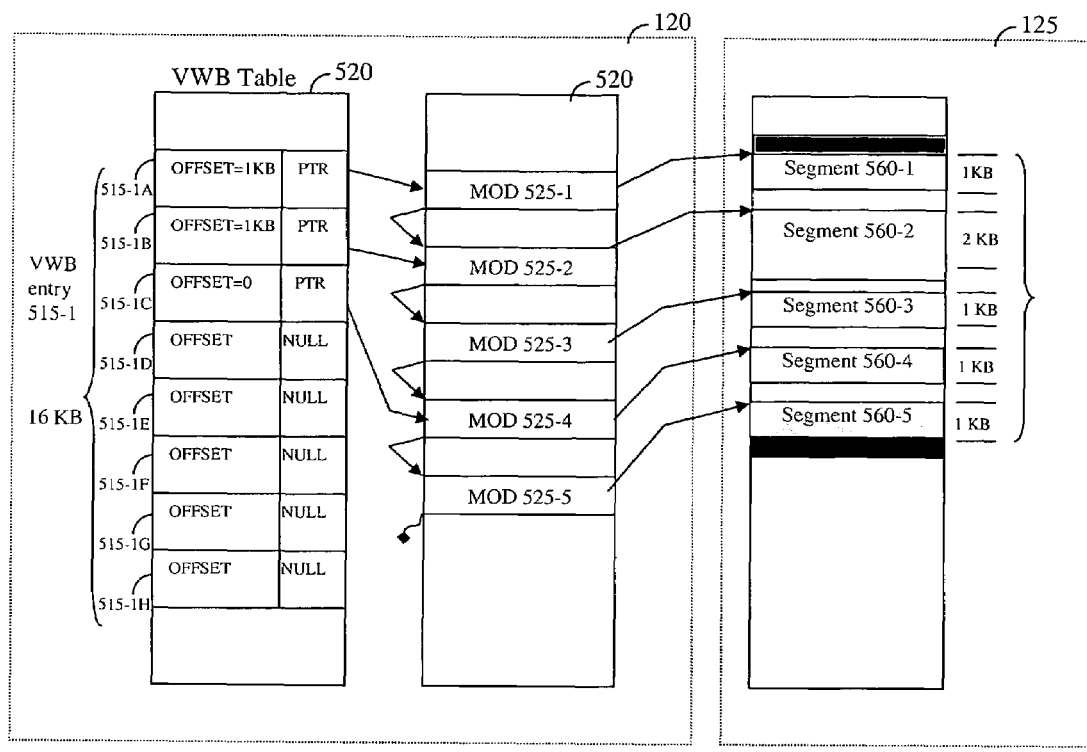

Referring now to FIGS. 5A-B, where an example of the reassembling of record 550 according to aspects of the disclosed teachings is shown. The size of record 550 is six kilobytes (KB). Record 550 includes five segments, segments 560-1 through 560-5, where the first half (i.e., first 1 KB) of segment 560-1 and the last half of segment 560-5 (i.e., the bottom 1 KB) contain data belonging to different record. Segments 560 are stored in local memory in the correct order, i.e., segment 560-1 is followed by 560-2, and so on. Initially, as can be seen in FIG. 5A, segments 560 are linked in local memory 125 according to an order that corresponds to the original record. Further, MODs 525-1 through 525-5 point to segments 560-1 through 560-5 respectively.

As shown in FIG. 5B, a VWB entry 515-1 is allocated to VWB table 510 in NC 120. The size of the private buffer represented by VWB entry 515-1 is 16 KB that is mapped into host memory 115. At this point, no actual physical address of local memory 125 is associated with VWB entry 515-1. VWB 515-1 is made up of eight sub-entries 515-1A through 515-1H. Each of sub-entries 515 points to an incremental 2 KB offset in VWB entry 515-1, namely there is a sub-entry for each 2 KB of data in record 550. The pointer field of sub-entry 515-1A is assigned to point to MOD 525-1. The offset field is set to the value of 1 KB, indicating that record 550 actually starts 1 KB from the beginning of the payload data in segment 560-1. Sub-entry 515-1A corresponds to offset zero in record 550. Sub-entry 515-1B corresponds to an offset of 2 KB in record 550, and it points to MOD 525-2. The offset field of sub-entry 515-1B includes a 1 KB offset value, since the first 1 KB of segment 560-2 is already pointed to by sub-entry 515-1A. Sub-entry 515-1C corresponds to an offset of 4K in record 550, and it points to MOD 525-4. It should be noted that MOD 525-3 and MOD 525-5 are not pointed to by any sub-entry, since these MODs do not include any 2 KB boundary in record 550. It should be further noted that since record 550 is 6 KB long, only sub-entries 515-1A, 515-1B, and 515-1C are actually used. FIG. 5B shows the status of VWB 515-1 after reassembling record 550.

It should be appreciated that a faster random memory access could be achieved by increasing the number of sub-entries in a VWB entry. However, increasing the number of sub-entries will consume more space in VWB table 510. For instance, if each of sub-entries 515 points to an incremental 1 KB offset in VWB entry 515-1, six sub-entries (e.g. 515-5A through 515-F) are required. On the other, if each of sub-entries 515 points to an incremental 6 KB offset in VWB entry 515-1, only a single sub-entry (e.g. 515-5A) is required.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method comprising:
saving data segments of a data record having a plurality of data segments in a local memory of a network controller (NC);
assigning a virtual write buffer (VWB) entry, in the NC local memory, for the saved data record; and
virtually reassembling the data segments of the saved data record in the NC local memory using the VWB entry to form a reassembled data record.

2. The method of claim 1, further comprising: correlating a private buffer to a memory address space in a host local memory.

3. The method of claim 1, wherein the NC is coupled to a storage target system and to a network.

4. The method of claim 1, further comprising:
sending the reassembled data record from the NC directly to an I/O controller of a storage device.

5. The method of claim 1, further comprising:
receiving the data record using a sub-process comprising:
performing a transport layer processing on the data segments; and,
assigning a memory object descriptor (MOD) to each of the data segments.

6. The method of claim 5, wherein each MOD points to a memory location where a corresponding data segment is stored in the NC local memory.

7. The method of claim 5, wherein the MODS are linked together to form a record structure.

8. The method of claim 2, wherein an available private buffer is used from a pool of pre-allocated private buffers.

9. The method of claim 2, wherein the NC maintains a VWB table, wherein the VWB table includes at least a VWB entry.

10. The method of claim 9, wherein the VWB entry comprises at least two sub-entries, wherein a first sub-entry is an offset field and a second sub-entry is a pointer field.

11. The method of claim 10, wherein a memory address space utilized by the VWB entry is mapped to the memory address space of the allocated private buffer when the VWB entry is assigned.

12. The method of claim 10, wherein reassembling the data segments comprises setting the offset field and the pointer field.

13. The method of claim 12, wherein a memory object descriptor (MOD) is assigned to each of the data segments, and
wherein setting the offset field and the pointer field further comprises:
iteratively, for each MOD, determining a size of a corresponding data segment pointed by each MOD;
setting the offset field to a size of the corresponding data segment pointed by the MOD; and,
setting the pointer field to point to each MOD.

14. The method of claim 13, wherein a VWB entry is associated with each allocated private buffer.

15. The method of claim 14, further comprising:
sending the reassembled data record from the NC directly to an I/O controller of a storage device,
wherein the reassembled data record is sent to the I/O controller using a sub-process comprising:
providing the I/O controller with an address space of the private buffer associated with the VWB entry;
translating the address space of the VWB entry to a physical address location of the reassembled data record;
obtaining the reassembled data record from the physical address location; and, sending the reassembled data record directly to the I/O controller over an I/O bus.

16. The method of claim 15, wherein the physical address location designates a location of the reassembled data record in the NC local memory.

17. The method of claim 15, wherein the I/O controller is provided with the address of the private buffer, upon initiating a direct memory access (DMA) request by the I/O controller.

18. The method of claim 15, wherein the NC sends the reassembled data record upon a reception of a DMA read request initiated by the I/O controller.

19. A method comprising:
    correlating a private buffer to a memory address space in a host local memory
    saving data segments of a data record having a plurality of data segments in a local memory of a network controller (NC);
    assigning a virtual write buffer (VWB) entry, in the NC local memory, for the saved data record, the memory address space utilized by the VWB entry being mapped to the memory address space of the allocated private buffer when the VWB entry is assigned;
    maintaining, in the NC, a VWB table, wherein the VWB table includes at least a VWB entry, the VWB entry including at least two sub-entries, wherein a first sub-entry is an offset field and a second sub-entry is a pointer field; and
    reassembling the data segments of the saved data record using the VWB entry to form a reassembled data record.

20. The method of claim 19, wherein the NC is coupled to a storage target system and to a network.

21. The method of claim 19, further comprising:
    sending the reassembled data record from the NC directly to an I/O controller of a storage device.

22. The method of claim 19, further comprising:
    receiving the data record using a sub-process comprising:
        performing transport layer processing on the data segments; and,
        assigning a memory object descriptor (MOD) to each of the data segments.

23. The method of claim 22, wherein each the MOD points to a memory location where a corresponding data segment is stored in the NC local memory.

24. The method of claim 22, wherein the MODS are linked together to form a record structure.

25. The method of claim 19, wherein an available private buffer is used from a pool of pre-allocated private buffers.

26. The method of claim 19, wherein reassembling the data segments comprises setting the offset field and the pointer field.

27. The method of claim 26, wherein a memory object descriptor (MOD) is assigned to each of the data segments, and
    wherein setting the offset field and the pointer field further comprises:
        iteratively, for each MOD, determining a size of a corresponding data segment pointed by each MOD;
        setting the offset field to a size of the corresponding data segment pointed by the MOD; and,
        setting the pointer field to point to each MOD.

28. The method of claim 27, wherein a VWB entry is associated with each allocated private buffer.

29. The method of claim 28, further comprising:
    sending the reassembled data record from the NC directly to an I/O controller of a storage device,
    wherein the reassembled data record is sent to the I/O controller using a sub-process comprising:
        providing the I/O controller with an address space of the private buffer associated with the VWB entry;
        translating the address space of the VWB entry to a physical address location of the reassembled data record;
        obtaining the reassembled data record from the physical address location; and
        sending the reassembled data record directly to the I/O controller over an I/O bus.

30. The method of claim 29, wherein the physical address location designates a location of the reassembled data record in the NC local memory.

31. The method of claim 29, wherein the I/O controller is provided with the address of the private buffer, upon initiating a direct memory access (DMA) request by the I/O controller.

32. The method of claim 29, wherein the NC sends the reassembled data record upon a reception of a DMA read request initiated by the I/O controller.

* * * * *

UNITED STATES PATENT AND TRADEMARK OFFICE
CERTIFICATE OF CORRECTION

| | | |
|---|---|---|
| PATENT NO. | : 7,668,841 B2 | Page 1 of 1 |
| APPLICATION NO. | : 10/796273 | |
| DATED | : February 23, 2010 | |
| INVENTOR(S) | : Uzrad-Nali et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1568 days.

Signed and Sealed this

Seventh Day of December, 2010

David J. Kappos
*Director of the United States Patent and Trademark Office*